(12) United States Patent
Yun et al.

(10) Patent No.: US 7,957,286 B2
(45) Date of Patent: Jun. 7, 2011

(54) METHOD FOR ESTIMATING OPTIMIZED TRANSMISSION BIT RATE IN WIRELESS LOCAL AREA NETWORK SYSTEM

(75) Inventors: Ji Hoon Yun, Seoul (KR); Seung Woo Seo, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 304 days.

(21) Appl. No.: 11/859,251

(22) Filed: Sep. 21, 2007

(65) Prior Publication Data
US 2008/0192815 A1 Aug. 14, 2008

(30) Foreign Application Priority Data
Feb. 9, 2007 (KR) .................. 10-2007-0013583

(51) Int. Cl.
*G01R 31/08* (2006.01)
(52) U.S. Cl. ..................... 370/230.1; 370/232
(58) Field of Classification Search ............ 370/230.1
See application file for complete search history.

(56) References Cited

U.S. PATENT DOCUMENTS

| 2006/0215596 A1* | 9/2006 | Krishnaswamy et al. ..... 370/328 |
| 2006/0223442 A1* | 10/2006 | Stephens .................... 455/67.11 |
| 2006/0285494 A1* | 12/2006 | Li et al. ......................... 370/235 |

* cited by examiner

*Primary Examiner* — Derrick W Ferris
*Assistant Examiner* — Matthew Hopkins
(74) *Attorney, Agent, or Firm* — LRK Patent Law Firm

(57) ABSTRACT

The present invention relates to a method for estimating an optimized transmission bit rate in a wireless local area network (LAN) system, which is to provide an accurate data transmission bit rate according to channel status when block data are transmitted in the wireless LAN system. According to the present invention, there is provided a method for estimating an optimized transmission bit rate according to the status of a data transmission bit rate in a wireless LAN system, comprising the steps of determining whether to change a current data transmission bit rate in a wireless LAN network; and estimating an optimized transmission bit rate on the basis of results of the determination in the determining step, and reflecting the estimated transmission bit rate upon transmission of data. The method is effective in that when data blocks are transmitted in the wireless LAN system, the performance degradation of data transmission invited due to an inappropriate selection of a transmission bit rate can be reduced.

5 Claims, 4 Drawing Sheets

METHOD FOR ESTIMATING OPTIMIZED TRANSMISSION BIT RATE IN WIRELESS LOCAL AREA NETWORK SYSTEM

CLAIM OF PRIORITY

This application claims priority under 35 USC 119 to Korean Patent Application No. 10-2007-0013583, filed on Feb. 9, 2007, which is incorporated by reference in its entirety.

BACKGROUND OF THE INVENTION

1. Field of the Invention

The present invention relates to a method for estimating an optimized transmission bit rate in a wireless local area network (LAN) system, and more particularly, to a method for estimating an optimized transmission bit rate in a wireless LAN system, which is to provide an accurate data transmission bit rate according to channel status when block data are transmitted in the wireless LAN system.

2. Description of the Related Art

The physical layer of a wireless LAN system to which IEEE 802.11 is applied supports a variety of transmission bit rates using different modulation and coding schemes. For example, IEEE 802.11a supports eight transmission bit rates between 6 Mbps to 54 Mbps, IEEE 802.11b supports four transmission bit rates between 1 Mbps to 11 Mbps, and IEEE 802.11g supports twelve transmission bit rates between 1 Mbps to 54 Mbps. Here, since each of the transmission bit rates has individual bit error characteristics, there usually exists a single optimized transmission bit rate in a given channel condition, and a lower transmission bit rate generally has further low bit error characteristics.

Accordingly, mobile communication network operators are encouraged to contrive a method for increasing a throughput by applying an optimized transmission bit rate, in which channel status changed in real-time according to time and space is reflected, to a mobile communication terminal and a mobile communication system.

In order to solve the problem, a method for estimating a transmission bit rate considering channel status has been applied to a mobile communication terminal. However, since the channel status is inaccurately measured when estimating a transmission bit rate or the channel status is rapidly changed, the mobile communication terminal frequently select a non-optimized transmission bit rate.

If it is attempted to transmit data at a transmission bit rate higher than an optimized transmission bit rate, the probability for the data transmission to fail is high. Contrarily, if it is attempted to transmit data at a transmission bit rate lower than the optimized transmission bit rate, the success rate of the data transmission is increased. However, there is a problem in that transmission efficiency is decreased since the channel is unnecessarily occupied for an extended period of time.

The side-effect of selecting an inappropriate transmission bit rate gets severer when the block acknowledgement (BA) scheme defined in the IEEE 802.11e is applied.

In more detail, if a plurality of data frames (MAC protocol data unit: MPDU), which are grouped as a block, are consecutively transmitted, only one block acknowledgement is transmitted in response thereto. Therefore, waste of bandwidth can be reduced as compared with transmitting an acknowledgement for each data frame. However, since a plurality of data frames are transmitted at a time before transmitting an acknowledgement, the same transmission bit rate is applied to each of corresponding data frames that are grouped as a block.

Accordingly, when transmitting data using the block acknowledgement scheme, inappropriate increase of a transmission bit rate invites transmission failure of a plurality of frames, and inappropriate decrease of a transmission bit rate invites waste of channel bandwidth for an extended period of time compared with transmitting a single frame.

SUMMARY OF THE INVENTION

Accordingly, the present invention is conceived to solve the aforementioned problems in the prior art. An object of the present invention is to provide a method for estimating an optimized transmission bit rate in a wireless LAN system, wherein channel status of a network is more accurately measured when data blocks are transmitted in the wireless LAN system, thereby increasing data transmission success rate.

Another object of the present invention is to provide a method for estimating an optimized transmission bit rate in a wireless LAN system, wherein when a transmission bit rate is changed in the wireless LAN system in consideration of channel status of a network, a changed transmission bit rate is first applied only to some of a plurality of frames contained in block data to gradually change the data transmission bit rate according to the channel status of the network.

According to an aspect of the present invention for achieving the object, there is provided a method for estimating an optimized transmission bit rate according to the status of a data transmission bit rate in a wireless LAN system, comprising the steps of determining whether to change a current data transmission bit rate in a wireless LAN network; and estimating an optimized transmission bit rate on the basis of results of the determination in the determining step, and reflecting the estimated transmission bit rate upon transmission of data.

DETAILED DESCRIPTION OF THE PREFERRED EMBODIMENT

Hereinafter, preferred embodiments of the present invention will be described in more detail with reference to the accompanying drawings.

Hereinafter, a method for estimating an optimized transmission bit rate in a wireless LAN system, which is recited in the present invention, can be applied to an access point (AP) or a mobile communication terminal, such as a handheld phone, cellular phone, personal data assistant (PDA), personal computer (PC) capable of short distance communication, which can wireless communicate with the wireless LAN system.

Figure 1:
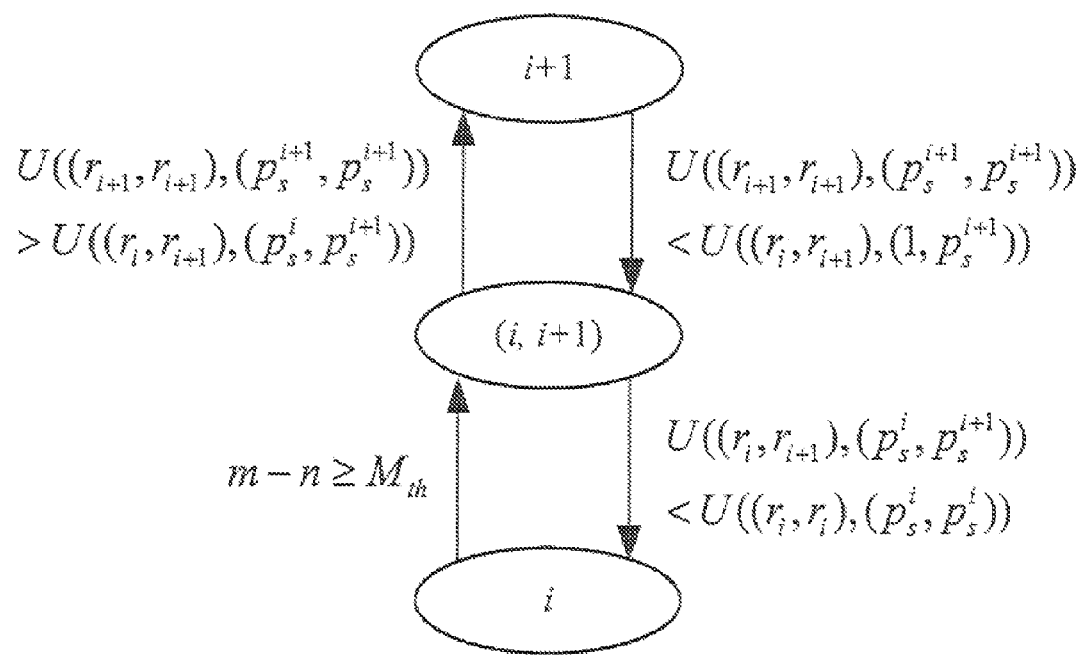
FIG. 1 is a view briefly illustrating a method for estimating an optimized transmission bit rate according to the present invention.

First, FIG. 1 is a view briefly illustrating a method for estimating an optimized transmission bit rate according to the present invention.

As shown in FIG. 1, a terminal (not shown) that transmits data in a wireless LAN system changes a current data transmission bit rate considering channel status of a network according to the status of a transmission bit rate applied to the terminal itself.

In more detail, when the terminal transmits a data block, i.e., a plurality of data frames configured into a group, data in each of a plurality of the data frames are transmitted at the same transmission bit rate or at a transmission bit rate i or i+1. As the channel environment of the wireless LAN network is changed, the terminal sequentially changes the status of a data transmission bit rate (transmission bit rate i→transmission bit rate i, i+1→transmission bit rate i+1, or transmission bit rate i+1→transmission bit rate i, i+1→transmission bit rate i) in consideration of the status of the data transmission bit rate applied to the terminal itself as shown in FIG. 1.

For example, the status of a data transmission bit rate is divided into a single transmission bit rate where the same transmission bit rate i or i+1 is applied to all of a plurality of data frames contained in the same data block, and a composite transmission bit rate where transmission bit rates i and i+1 are compositely applied to a plurality of data frames contained in the same data block.

The purpose of the composite transmission bit rate is to reduce transmission failure that can be generated since only a transmission bit rate i or a transmission bit rate i+1 is applied to all data frames in a data block when the data transmission bit rate of the terminal is changed, and to gradually change the data transmission bit rate according to the channel environment of the wireless LAN network by applying a transmission bit rate i to some of the frames in a data block and applying a transmission bit rate i+1 to the other data frames in the data block.

The terminal shown in FIG. 1 is either an AP or a mobile communication terminal capable of communicating with a wireless LAN system.

Figure 2:
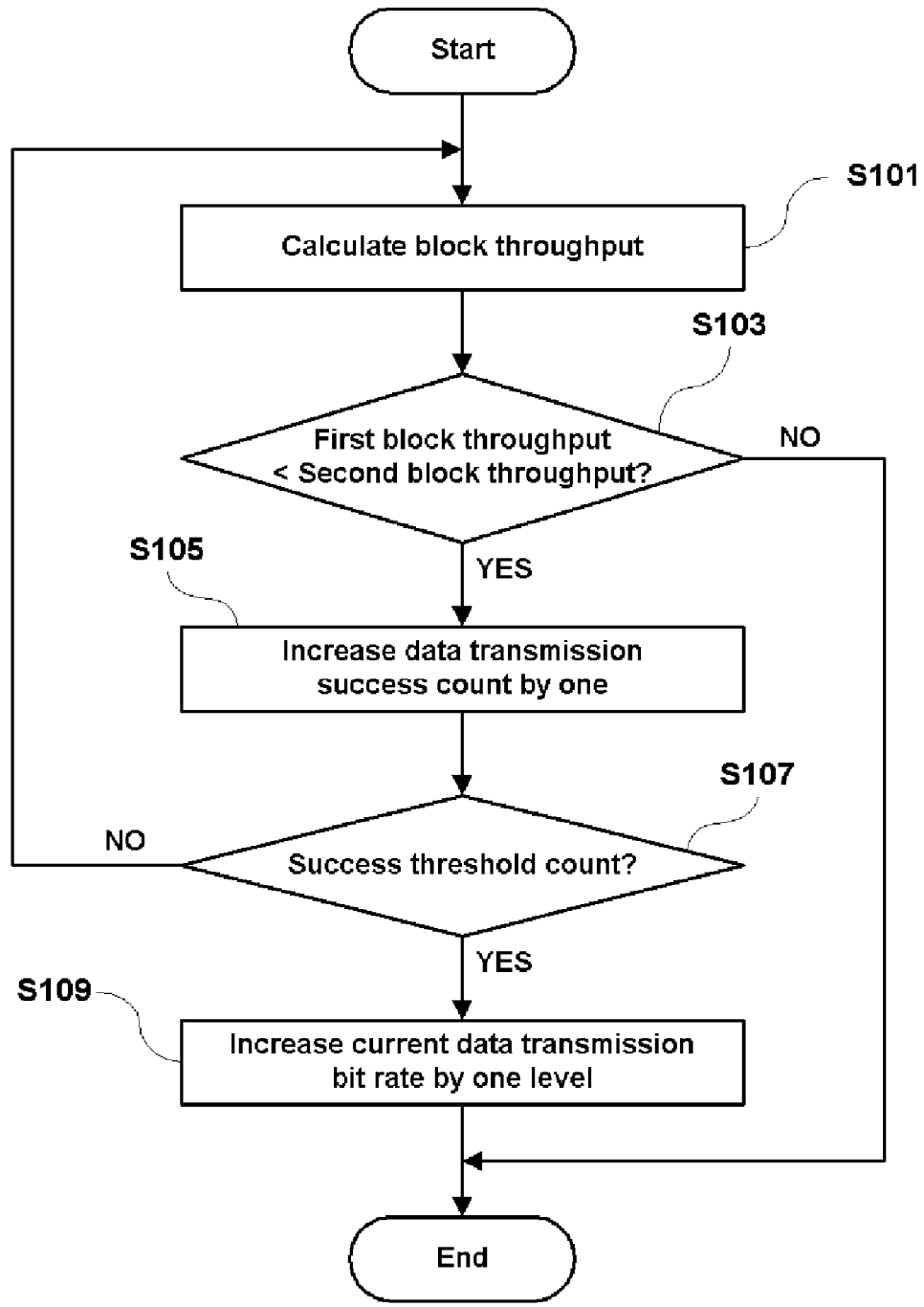
FIG. 2 is a flowchart illustrating an embodiment of the method for estimating an optimized transmission bit rate according to the present invention.

FIG. 2 is a flowchart illustrating an embodiment of the method for estimating an optimized transmission bit rate according to the present invention, which will be described with an example where the status of the data transmission bit rate of a terminal is a composite transmission bit rate (both of transmission bit rates i and i+1 are compositely applied to the data frames).

First, the terminal calculates a first block throughput U* for the current data transmission bit rate and a second block throughput U+ for a data transmission bit rate that is one level higher than the current data transmission bit rate, using pre-set mathematical expression 1, as data blocks are transmitted in the wireless LAN network (step S101).

$$U((r_i,r_j),(p_s^i,p_s^j)) = (p_s^i k_i + p_s^j k_j)/T_b(r_i,r_j)$$ [Mathematical expression 1]

where $r_i$ denotes the bit rate of a transmission bit rate i, $r_j$ denotes the bit rate of a transmission bit rate j, $p_s^i$ denotes transmission success probability of a data frame transmitted at the transmission bit rate i, $p_s^j$ denotes transmission success probability of a data frame transmitted at the transmission bit rate j, $k_i$ denotes the total number of bytes of payload data transmitted at the transmission bit rate i in a block, $k_j$ denotes the total number of bytes of payload data transmitted at the transmission bit rate j in a block, and $T_b(r_i,r_j)$ denotes time needed for block transmission and block acknowledgement therefor. The transmission success probability of a data frame is shown in mathematical expression 2.

$$p_s^i = l_i/N_i$$ [Mathematical expression 2]

where $l_i$ denotes the number of data frames successfully transmitted at the transmission bit rate i in a block, and $N_i$ denotes the number of data frames transmitted at the transmission bit rate i in a block.

Next, the terminal compares the first block throughput U* and the second block throughput U+ that are calculated in step S101, and confirms whether the first block throughput U* is lower than the second block throughput U+ ($U((r_{i+1},r_{i+1}),(p_s^{i+1},p_s^{i+1})) > U((r_i,r_{i+1}),(p_s^i,p_s^{i+1}))$ of FIG. 1) (step S103).

If the first block throughput U* is lower than the second block throughput U+ in step S103, the terminal increases a data transmission success count by one (the step of increasing a data transmission success count by one in FIG. 2) (step S105), and compares it with a pre-set success threshold count $S_{th}$ (step S107).

If the data transmission success count (the data transmission success count increased by one) is larger than or equal to the pre-set success threshold count in step S107, the terminal increases the current data transmission bit rate by one level and reflects it when the data transmission (step S109). That is, an optimized transmission bit rate is a value that is one level higher than the current data transmission bit rate.

In the meantime, if the first block throughput U* is not lower than the second block throughput U+ in step S103, the terminal terminates the process of estimating a transmission bit rate.

On the other hand, if the data transmission success count is smaller than the pre-set success threshold count in step S107, the terminal performs the steps after step S101.

Figure 3:
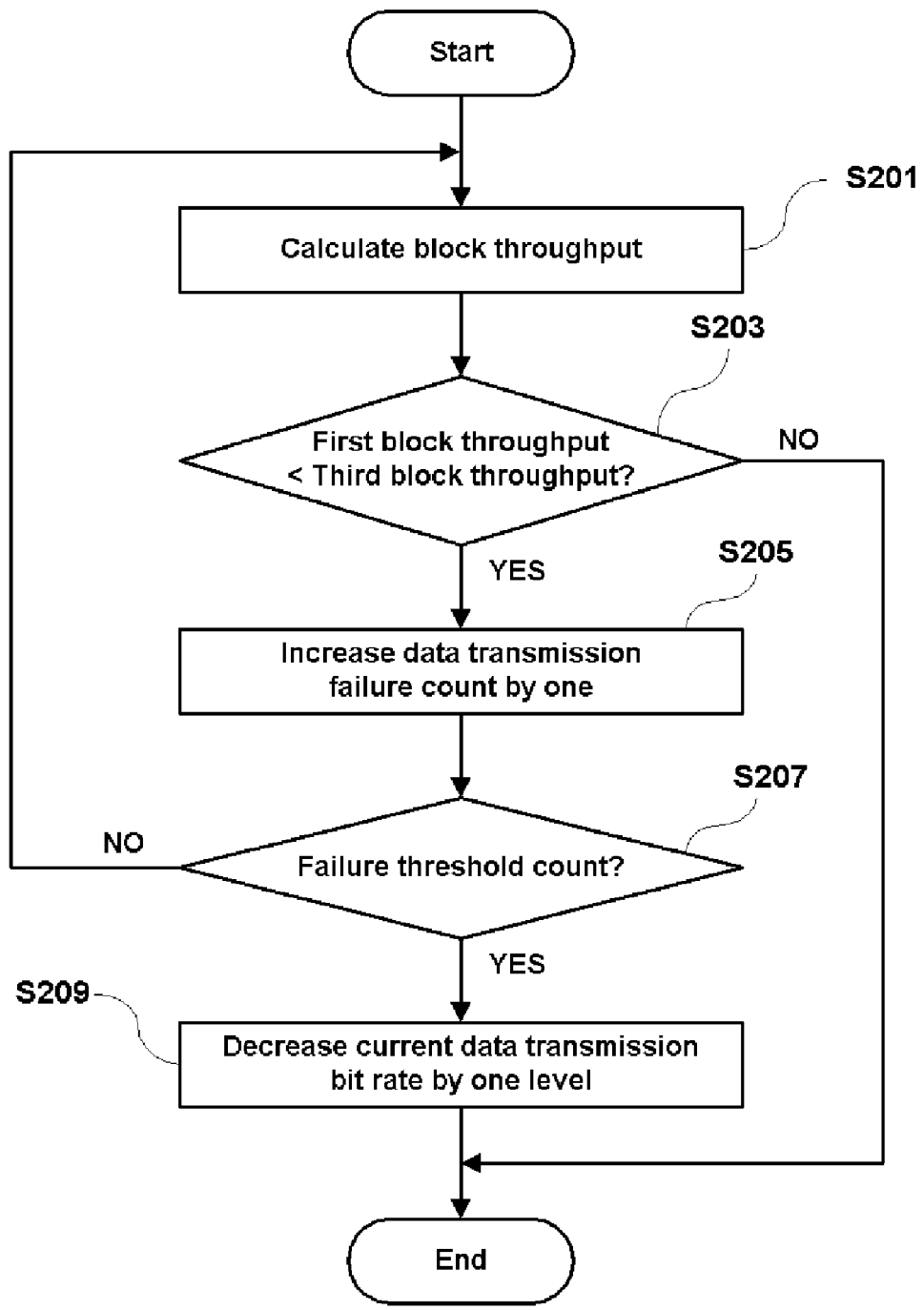
FIG. 3 is a flowchart illustrating another embodiment of the method for estimating an optimized transmission bit rate according to the present invention.

FIG. 3 is a flowchart illustrating another embodiment of the method for estimating an optimized transmission bit rate according to the present invention, which will be described with an example where the status of the data transmission bit rate of a terminal is a composite transmission bit rate (both of transmission bit rates i and i+1 are compositely applied to the data frames), and an example where the status of the data transmission bit rate of a terminal is a single transmission bit rate (either of a transmission bit rate i or i+1 is applied to the data frames) and it is determined whether to decrease the current data transmission bit rate.

First, the terminal calculates a first block throughput U* for the current data transmission bit rate and a third block throughput U− for a data transmission bit rate that is one level lower than the current data transmission bit rate, using pre-set mathematical expression 1, as data blocks are transmitted in the wireless LAN network (step S201).

Here, if the status of the data transmission bit rate is a single transmission bit rate and it is determined whether to decrease the current data transmission bit rate, when the terminal calculates the third block throughput U−, the transmission success probability of a data transmission bit rate that is one level lower than the current data transmission bit rate is assumed to be one.

Next, the terminal compares the first block throughput U* and the third block throughput U− that are calculated in step S201, and confirms whether the first block throughput U* is lower than the third block throughput U− (step S203).

At this time, a case where the status of the data transmission bit rate of the terminal is a composite transmission bit rate can be expressed in mathematical expression $U((r_i,r_{i+1}),(p_s^i,p_s^{i+1})) < U((r_i,r_i),(p_s^i,p_s^i))$ of FIG. 1, and a case where the status of the data transmission bit rate of the terminal is a single transmission bit rate and it is determined whether to decrease the current data transmission bit rate can be expressed in mathematical expression $U((r_{i+1},r_{i+1}),(p_s^{i+1},p_s^{i+1})) < U((r_i,r_{i+1}),(1,p_s^{i+1}))$ of FIG. 1.

If the first block throughput U* is lower than the third block throughput U− in step S203, the terminal increases a data transmission failure count by one (the step of increasing a data transmission failure count by one in FIG. 3) (step S205), and compares it with a pre-set failure threshold count $F_{th}$ (step S207).

If the data transmission failure count (the data transmission failure count increased by one) is larger than or equal to the pre-set failure threshold count in step S207, the terminal decreases the current data transmission bit rate by one level and reflects it when the data transmission (step S209). That is, an optimized transmission bit rate is a value that is one level lower than the current data transmission bit rate.

In the meantime, if the first block throughput U* is not lower than the third block throughput U− in step S203, the terminal terminates the process of estimating a transmission bit rate.

On the other hand, if the data transmission failure count is smaller than the pre-set failure threshold count in step S207, the terminal performs the steps after step S201.

Figure 4:
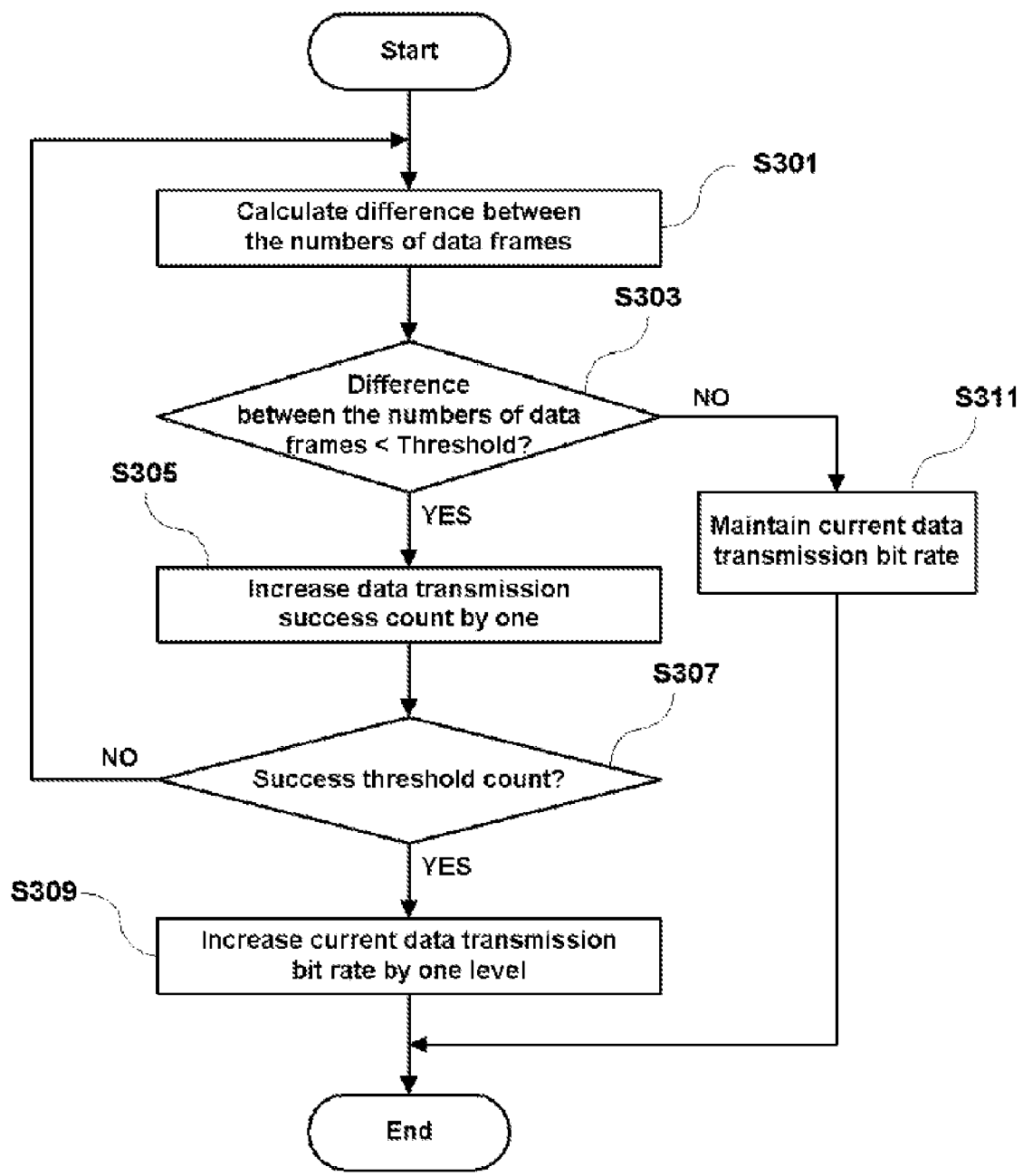
FIG. 4 is a flowchart illustrating a further embodiment of the method for estimating an optimized transmission bit rate according to the present invention.

FIG. 4 is a flowchart illustrating a further embodiment of the method for estimating an optimized transmission bit rate according to the present invention, which will be described with an example where the status of the data transmission bit rate of a terminal is a single transmission bit rate (either of a transmission bit rate i or i+1 is applied to the data frames) and it is determined whether to increase the current data transmission bit rate.

First, the terminal calculates a difference between the number m of successfully transmitted data frames and the number n of unsuccessfully transmitted data frames in a specific data block (step S301).

Next, the terminal compares the difference calculated in step S301 with a pre-set threshold $M_{th}$, and confirms whether the difference between the number m of successfully transmitted data frames and the number n of unsuccessfully transmitted data frames is larger than or equal to the threshold $M_{th}$ (m−n≧$M_{th}$ in FIG. 1) (step S303).

If the difference between the number m of successfully transmitted data frames and the number n of unsuccessfully transmitted data frames is larger than or equal to the threshold $M_{th}$ in step S303, the terminal increases a data transmission success count by one (the step of increasing a data transmission success count by one in FIG. 4) (step S305), and compares it with a pre-set success threshold count $S_{th}$ (step S307).

If the data transmission success count (the data transmission success count increased by one) is larger than or equal to the pre-set success threshold count in step S307, the terminal increases the current data transmission bit rate by one level and reflects it when the data transmission (step S309). That is, an optimized transmission bit rate becomes a value that is one level higher than the current data transmission bit rate.

For example, in a case where it is assumed that a data block includes four data frames and the threshold $M_{th}$ is two, if all of the data frames in the data block are successfully transmitted (m=4, n=0) or three of the data frames are successfully transmitted (m=3, n=1), the terminal determines that a one-level-higher data transmission bit rate is preferable to the current data transmission bit rate.

In the meantime, if the difference between the number m of successfully transmitted data frames and the number n of unsuccessfully transmitted data frames is smaller than the threshold $M_{th}$ in step S303, the terminal maintains the current data transmission bit rate (step S311) and terminates the process of estimating a transmission bit rate.

On the other hand, if the data transmission success count is smaller than the pre-set success threshold count in step S307, the terminal performs the steps after step S301.

Accordingly, a method for estimating an optimized transmission bit rate in a wireless LAN system of the present invention is effective in that when transmitting a data block, the wireless LAN system changes a transmission bit rate for some frames in the block before changing the data transmission bit rate according to a channel environment of a network to thereby reduce the performance degradation of data transmission invited due to an inappropriate selection of a transmission bit rate.

Further, the present invention is effective in that a channel can be further accurately measured since the success probability of a plurality of data transmission bit rates can be simultaneously confirmed.

Furthermore, since a method for estimating an optimized transmission bit rate in a wireless LAN system of the present invention can be implemented in a terminal to which IEEE 802.11e is applied without modifying the IEEE 802.11e, it is effective in that the costs needed for implementing the technique can be reduced.

The present invention can be implemented in other specific forms without changing the technical spirit and essential feature of the present invention, so that it should be understood by those skilled in the art that the embodiments described and illustrated above are merely for illustrative purposes and not for limitation purposes. The true scope of the present invention should be defined by the technical spirit of the appended claims rather than the above detailed descriptions. In addition, the present invention should be interpreted to encompass all modifications and changes that would occur from the spirit and scope of the claims and the equivalence thereof.

What is claimed is:

1. A method for estimating an optimized transmission bit rate according to a status of a data transmission bit rate in a wireless local area network (LAN) system, the method comprising the steps of:

a) determining, by a terminal that transmits data in the wireless local network (LAN) system, whether to change a current data transmission bit rate in a wireless LAN network in consideration of the status of the network's channel according to the status of the transmission bit rate; and b) estimating an optimized transmission bit rate on the basis of results of the determination in step a), and changing the current data transmission bit rate into the estimated transmission bit rate upon transmission of data, by the terminal, wherein if the status of the data transmission bit rate is a composite transmission bit rate, step a) comprises the steps of:

a-1) calculating a first block throughput U* for the current data transmission bit rate and a second block throughput U+ for a data transmission bit rate that is one level higher than the current data transmission bit rate, using pre-set conditions, as data blocks are transmitted in the wireless LAN network;

a-2) comparing the first block throughput U* with the second block throughput U+, and increasing a data transmission success count by one if the first block throughput U* is lower than the second block throughput U+; and a-3) comparing the data transmission success count increased by one in step a-2) with a pre-set success threshold count $S_{th}$, and changing the current data transmission bit rate if the data transmission success count increased by one is larger than the pre-set success threshold count $S_{th}$, wherein if the current data transmission bit rate is changed in step a-3), the optimized transmission bit rate in step b) is a value that is one level higher than the current data transmission bit rate, wherein the pre-set conditions are: $U((r_i,r_j),(p_s^i,p_s^j))=(p_s^i k_i+p_s^j k_j)/T_b(r_i,r_j)$, where $r_i$ denotes the bit rate of a transmission bit rate i, $r_j$ denotes the bit rate of a transmission bit rate j, $p_s^i$ denotes transmission success probability of a data frame transmitted at the transmission bit rate i, $p_s^j$ denotes transmission success probability of a data frame transmitted at the transmission bit rate j, $k_i$ denotes the total number of bytes of payload data transmitted at the transmission bit rate i in a block, $k_j$ denotes the total number of bytes of payload data transmitted at the transmission bit rate j in the block, and $T_b(r_i,r_j)$ denotes time needed for block transmission and block acknowledgement therefor.

2. A method for estimating an optimized transmission bit rate according to a status of a data transmission bit rate in a wireless local area network (LAN) system, the method comprising the steps of:

a) determining, by a terminal that transmits data in the wireless local network (LAN) system, whether to change a current data transmission bit rate in a wireless LAN network in consideration of the status of the network's channel according to the status of the transmission bit rate; and b) estimating an optimized transmission bit rate on the basis of results of the determination in step a), and changing the current data transmission bit rate into the estimated transmission bit rate upon transmission of data, by the terminal, wherein if the status of the data transmission bit rate is a composite transmission bit rate, step a) comprises the steps of:

a-1) calculating a first block throughput U* for the current data transmission bit rate and a third block throughput U– for a data transmission bit rate that is one level lower than the current data transmission bit rate, using pre-set conditions, as data blocks are transmitted in the wireless LAN network;

a-2) comparing the first block throughput U* with the third block throughput U–, and increasing a data transmission failure count by one if the first block throughput U* is lower than the third block throughput U–; and a-3) comparing the data transmission failure count increased by one in step a-2) with a pre-set failure threshold count $F_{th}$, and changing the current data transmission bit rate if the data transmission failure count increased by one is larger than the pre-set failure threshold count $F_{th}$.

wherein if the current data transmission bit rate is changed in step a-3), the optimized transmission bit rate in step b) is a value that is one level lower than the current data transmission bit rate, wherein the pre-set conditions are: $U((r_i,r_j),(p_s^i,p_s^j))=(p_s^i k_i+p_s^j k_j)/T_b(r_i,r_j)$, where $r_i$ denotes the bit rate of a transmission bit rate i, $r_j$ denotes the bit rate of a transmission bit rate j, $p_s^i$ denotes transmission success probability of a data frame transmitted at the transmission bit rate i, $p_s^j$ denotes transmission success probability of a data frame transmitted at the transmission bit rate j, $k_i$ denotes the total number of bytes of payload data transmitted at the transmission bit rate i in a block, $k_j$ denotes the total number of bytes of payload data transmitted at the transmission bit rate j in the block, and $T_b(r_i,r_j)$ denotes time needed for block transmission and block acknowledgement therefor.

3. A method for estimating an optimized transmission bit rate according to a status of a data transmission bit rate in a wireless local area network (LAN) system, the method comprising the steps of:

a) determining, by a terminal that transmits data in the wireless local network (LAN) system, whether to change a current data transmission bit rate in a wireless LAN network in consideration of the status of the network's channel according to the status of the transmission bit rate; and b) estimating an optimized transmission bit rate on the basis of results of the determination in step a), and changing the current data transmission bit rate into the estimated transmission bit rate upon transmission of data, by the terminal, wherein if the status of the data transmission bit rate is a single transmission bit rate and it is determined whether to decrease the current data transmission bit rate, step a) comprises the steps of:

a-1) calculating a first block throughput U* for the current data transmission bit rate and a third block throughput U– for a data transmission bit rate that is one level lower than the current data transmission bit rate, using pre-set conditions, as data blocks are transmitted in the wireless LAN network;

a-2) comparing the first block throughput U* with the third block throughput U–, and increasing a data transmission failure count by one if the first block throughput U* is lower than the third block throughput U–; and a-3) comparing the data transmission failure count increased by one in step a-2) with a pre-set failure threshold count $F_{th}$, and changing the current data transmission bit rate if the data transmission failure count increased by one is larger than the pre-set failure threshold count $F_{th}$, wherein if the current data transmission bit rate is changed in step a-3), the optimized transmission bit rate in step b) is a value that is one level lower than the current data transmission bit rate, wherein the pre-set conditions are: $U((r_i,r_j),(p_s^i,p_s^j))=(p_s^i k_i+p_s^j k_j)/T_b(r_i,r_j)$, where $r_i$ denotes the bit rate of a transmission bit rate i, $r_j$ denotes the bit rate of a transmission bit rate j, $p_s^i$ denotes transmission success probability of a data frame transmitted at the transmission bit rate i, $p_s^j$ denotes transmission success probability of a data frame transmitted at the transmission bit rate j, $k_i$ denotes the total number of bytes of payload data transmitted at the transmission bit rate i in a block, $k_j$ denotes the total number of bytes of payload data transmitted at the transmission bit rate j in the block, and $T_b(r_i,r_j)$ denotes time needed for block transmission and block acknowledgement therefor.

4. The method as claimed in any one of claims 1 to 3, wherein the $p_s^1$ is $l_i/N_i$, where $l_i$ denotes the number of data frames successfully transmitted at the transmission bit rate i in the block, and $N_i$ denotes the number of data frames transmitted at the transmission bit rate i in the block.

5. The method as claimed in any one of claims 1 to 3, wherein if the status of the data transmission bit rate is a single transmission bit rate and it is determined whether to decrease the current data transmission bit rate, when the third block throughput U– is calculated, the transmission success probability of the data transmission bit rate that is one level lower than the current data transmission bit rate is assumed to be one.

* * * * *